(12) United States Patent
Ishigooka et al.

(10) Patent No.: US 10,994,675 B2
(45) Date of Patent: May 4, 2021

(54) VEHICLE CONTROL DEVICE AND VEHICLE SYSTEM

(71) Applicant: Hitachi Automotive Systems, Ltd., Hitachinaka (JP)

(72) Inventors: Tasuku Ishigooka, Tokyo (JP); Satoshi Otsuka, Tokyo (JP); Kouhei Sakurai, Hitachinaka (JP); Taisetsu Tanimichi, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 333 days.

(21) Appl. No.: 16/090,434

(22) PCT Filed: Apr. 20, 2017

(86) PCT No.: PCT/JP2017/015849
§ 371 (c)(1),
(2) Date: Oct. 1, 2018

(87) PCT Pub. No.: WO2017/188109
PCT Pub. Date: Nov. 2, 2017

(65) Prior Publication Data
US 2019/0118745 A1    Apr. 25, 2019

(30) Foreign Application Priority Data
Apr. 28, 2016 (JP) .............................. JP2016-091013

(51) Int. Cl.
*B60R 16/023* (2006.01)
*G06F 9/54* (2006.01)
(Continued)

(52) U.S. Cl.
CPC .......... *B60R 16/0231* (2013.01); *B60R 16/02* (2013.01); *G06F 9/48* (2013.01);
(Continued)

(58) Field of Classification Search
CPC ....... B60R 16/0231; B60R 16/02; G06F 9/54; G06F 9/48; G06F 9/50; G06F 16/27; G06F 9/4887; G07C 5/0808
(Continued)

(56) References Cited

U.S. PATENT DOCUMENTS

| 2004/0064817 A1* | 4/2004 | Shibayama | G06F 9/5066 |
|---|---|---|---|
| | | | 718/104 |
| 2005/0102098 A1* | 5/2005 | Montealegre | G01C 21/32 |
| | | | 701/533 |

(Continued)

FOREIGN PATENT DOCUMENTS

| JP | 4-33130 A | 2/1992 |
|---|---|---|
| JP | 2006-126977 A | 5/2006 |

(Continued)

OTHER PUBLICATIONS

Extended European search report issued in counterpart European Application No. 17789392.2 dated Nov. 8, 2019 (six (6) pages).

(Continued)

*Primary Examiner* — Muhammad Shafi
(74) *Attorney, Agent, or Firm* — Crowell & Moring LLP

(57) ABSTRACT

The present invention provides technology for achieving both high responsiveness to an interrupt process and non-interference between control software. This vehicle control device comprises a storage device that stores various programs for controlling a vehicle, and a plurality of computation devices that include a first computation device and a second computation device, and that read a program from the storage device and execute the same. In addition, the storage device includes a first type of computation processing program executed not by time division and a second type of computation processing program executed by time division. The first computation device is configured to execute the first type of computation processing program, and the (Continued)

second computation device is configured to execute the second type of computation processing program.

9 Claims, 13 Drawing Sheets

(51) Int. Cl.
  *B60R 16/02* (2006.01)
  *G06F 9/48* (2006.01)
  *G06F 9/50* (2006.01)
  *G06F 16/27* (2019.01)
  *G07C 5/08* (2006.01)

(52) U.S. Cl.
  CPC .............. *G06F 9/4887* (2013.01); *G06F 9/50* (2013.01); *G06F 9/54* (2013.01); *G06F 16/27* (2019.01); *G07C 5/0808* (2013.01)

(58) Field of Classification Search
  USPC ....................................................... 701/29.1
  See application file for complete search history.

(56) References Cited

U.S. PATENT DOCUMENTS

| | | | | |
|---|---|---|---|---|
| 2006/0101430 A1* | 5/2006 | Hayashi | .................. | G06F 8/423 717/137 |
| 2009/0089795 A1* | 4/2009 | Yoshida | ................ | G06F 9/4881 718/107 |
| 2015/0039865 A1* | 2/2015 | Ishigooka | .................. | G06F 9/52 712/221 |
| 2016/0055032 A1* | 2/2016 | David | ................. | G06F 11/0793 718/107 |
| 2017/0039434 A1 | 2/2017 | Shima et al. | | |
| 2017/0113686 A1 | 4/2017 | Horita et al. | | |

FOREIGN PATENT DOCUMENTS

| | | | |
|---|---|---|---|
| JP | 2009-86733 | A | 4/2009 |
| JP | 2013-171547 | A | 9/2013 |
| JP | 2014-182606 | A | 9/2014 |
| JP | 2015-199439 | A | 11/2015 |
| JP | 2015-210592 | A | 11/2015 |
| JP | 2016-1417 | A | 1/2016 |
| WO | WO 02/069174 | A1 | 9/2002 |
| WO | WO 2014/170569 | A1 | 10/2014 |

OTHER PUBLICATIONS

Mane S. et al., "A Review on Steer-By-Wire System Using Flexray", Wireless Communication, Vehicular Technology, Information Theory and Aerospace & Electronic Systems Technology (Wireless Vitae), Feb. 28, 2011, pp. 1-4, IEEE, XP031998281 (four (4) pages).

Zimmer C., et al., "Fault Resilient Real-Time Design for NoC Architectures", Cyber-Physical Systems (ICCPS), Apr. 17, 2012, pp. 75-84, IEEE, XP032180468 (10 pages).

Japanese-language Office Action issued in Japanese Application No. 2016-091013 dated Mar. 31, 2020 (three pages).

"Avionics Application Software Standard Interface Part 1-Required Services, Arinc Specification 653P1-3", Nov. 15, 2010, Aeronautical Radio, Inc, Annapolis, MD, (269 pages).

International Search Report (PCT/ISA/210) issued in PCT Application No. PCT/JP2017/015849 dated Aug. 1, 2017 with English translation (four (4) pages).

Japanese-language Written Opinion (PCT/ISA/237) issued in PCT Application No. PCT/JP2017/015849 dated Aug. 1, 2017 (eight (8) pages).

Japanese-language Office Action issued in Japanese Application No. 2016-091013 dated Nov. 4, 2020 with English translation (eight (8) pages).

\* cited by examiner

FIG. 2

| SID | SLOT START TIME | SLOT END TIME | TID |
|---|---|---|---|
| 1 | 0 | 3 | 6 |
| 2 | 3 | 6 | 7 |
| 3 | 6 | 9 | 8 |
| 4 | 9 | 10 | - |
| 1 | 10 | 13 | 6 |
| 2 | 13 | 16 | 7 |
| 3 | 16 | 19 | 8 |
| 4 | 19 | 20 | - |
| . | . | . | . |
| . | . | . | . |
| . | . | . | . |

FIG. 3

| AID | OFFSET | CYCLE | TID |
|---|---|---|---|
| 1 | 9 | 10 | 3 |
| 2 | 9.5 | 10 | 4 |

FIG. 21

| TID | Core | CYCLE | PRIORITY | OFFSET | DEAD LINE | TASK NAME |
|---|---|---|---|---|---|---|
| 0 | 1 | - | 1 | 0 | | CORE 1 INITIALIZATION |
| 1 | 1 | 10 | 3 | 0 | | TRANSMISSION PROCESSING |
| 2 | 1 | - | 4 | - | | RECEPTION INTERRUPT PROCESSING |
| 3 | 1 | - | 2 | 0 | | SLOT SYNCHRONOUS read PROCESSING |
| 4 | 1 | - | 2 | 0 | | SLOT SYNCHRONOUS write PROCESSING |
| 5 | 2 | - | 1 | 0 | | CORE 2 INITIALIZATION |
| 6 | 2 | 10 | 1 | 0 | 3 | SENSOR FUSION |
| 7 | 2 | 10 | 1 | 3 | 3 | DYNAMIC MAP GENERATION |
| 8 | 2 | 10 | 1 | 6 | 3 | COURSE GENERATION |

FIG. 22

| AID | Core | OFFSET | CYCLE | TASK NAME |
|---|---|---|---|---|
| 1 | 1 | 9 | 10 | SLOT SYNCHRONOUS read PROCESSING |
| 2 | 1 | 9.5 | 10 | SLOT SYNCHRONOUS write PROCESSING |
| 3 | 2 | 0 | 10 | SENSOR FUSION |
| 4 | 2 | 3 | 10 | DYNAMIC MAP GENERATION |
| 5 | 2 | 6 | 10 | COURSE GENERATION |

FIG. 23

| TID | Core | CYCLE | PRIORITY | WCET | TASK NAME |
|---|---|---|---|---|---|
| 0 | 1 | - | 1 | 1 | CORE 1 INITIALIZATION |
| 1 | 1 | 10 | 3 | 0.5 | TRANSMISSION PROCESSING |
| 2 | 1 | 10 | 4 | 0.1 | RECEPTION INTERRUPT PROCESSING |
| 3 | 1 | - | 2 | 0.4 | SLOT SYNCHRONOUS read PROCESSING |
| 4 | 1 | - | 2 | 0.4 | SLOT SYNCHRONOUS write PROCESSING |
| 5 | 2 | - | - | 1 | CORE 2 INITIALIZATION |
| 6 | 2 | 10 | - | 2 | SENSOR FUSION |
| 7 | 2 | 10 | - | 2 | DYNAMIC MAP GENERATION |
| 8 | 2 | 10 | - | 2 | COURSE GENERATION |

VEHICLE CONTROL DEVICE AND VEHICLE SYSTEM

TECHNICAL FIELD

The present disclosure relates to a vehicle control device, and a vehicle system.

BACKGROUND ART

Vehicle systems often each include an ECU that operates computerized vehicle control equipment, in other words, an electronic control unit, and an in-vehicle network (local area network) that enables communication between a plurality of ECUs.

In recent years, a demand for realizing an automatic driving system that automatically carries a vehicle to a destination without the operation of a driver is increasing. The realization of an automatic driving system requires a high-accuracy outside recognition function, and a function of predicting surrounding environmental changes several seconds ahead to determine a traveling course, which requires a high operation load. Therefore, practical use of open source software (OSS) equipped with most-advanced algorithm is desired.

However, OSS is widely open to public, and thus there is also a case where in general quality is not high. Therefore, it is difficult to equip a system that requires high safety, such as an automotive control system, with OSS without any change. Accordingly, in preparation for an emergency, a method in which in a case where OSS occupies a CPU, other software is not influenced is desired.

For example, NPL 1 discloses performing a time division design in which an execution cycle of a system is determined, and a time zone of processing to be executed in the cycle is determined. This time zone is called a time window or a slot. At the time of system execution, specific processing is executed within the time of a specific time window according to the design. A unit of processing is a task or an interrupt process. When the specific processing does not end until the end time of the time window, it is basically determined that an error has occurred. Consequently, the processing is terminated. In this manner, according to NPL 1, pieces of software to be executed in respective time windows are capable of realizing non-interference so as not to influence one another.

CITATION LIST

Non Patent Literature

NPL 1: AVIONICS APPLICATION SOFTWARE STANDARD INTERFACE, PART 1-REQUIRED SERVICES, ARINC SPECIFICATION 653P1-3, 2010

SUMMARY OF INVENTION

Technical Problem

However, according to NPL 1, the interrupt process is also required to be assigned to a time window. Therefore, in such a case where an interrupt request occurs immediately after a time window for an interrupt process has ended, the interrupt process must be brought into a waiting state until series of processing assigned to the other time windows end, which leads to a decrease in responsiveness to an interrupt Basically, interrupt processes should often be immediately handled, and therefore lengthened waiting time is not preferable.

The present disclosure has been devised in consideration of such a situation, and provides technology for achieving both high responsiveness to an interrupt process and non-interference between control software.

Solution to Problem

In order to solve the above-described problem, the vehicle control device according to the present disclosure is provided with a storage device that stores various programs for controlling a vehicle, and a plurality of computation devices that include a first computation device and a second computation device, and that read a program from the storage device and execute the program. In addition, the storage device includes a first type of computation processing program executed not by time division, and a second type of computation processing program executed by time division. The first computation device is configured to execute the first type of computation processing program, and the second computation device is configured to execute the second type of computation processing program.

Further features related to the present disclosure will become apparent from the statement of the present description and accompanying drawings. In addition, modes of the present disclosure are achieved and realized by elements, various combinations of elements, the detailed statements described below, and aspects of the appended claims. It should be noted that the statement of the present description is merely exemplary illustration, and does not intend to limit the scope or application of the claims of the present disclosure in any way.

Advantageous Effects of Invention

With respect to the vehicle control device according to the present disclosure, a task operated in a time division on the basis of the time division is not influenced by processing of the other time divisions executed in the same core, and therefore non-interference can be ensured. In addition, inter-core communication updates shared data in the timing that does not refer to the shared data, and therefore non-interference can be ensured between cores too. Moreover, an interrupt process is executed by a means other than the time division, and therefore high responsiveness can be realized. This enables to achieve both high responsiveness to an interrupt process and non-interference between control software.

BRIEF DESCRIPTION OF DRAWINGS

FIG. 2 is a drawing illustrating a configuration example of slot setting information 131 according to the present embodiment.

FIG. 3 is a drawing illustrating a configuration example of alarm setting information 132 according to the present embodiment.

FIG. 21 is a drawing illustrating a configuration example (modified example) of task information 233 used when time division is executed according to priority scheduling even by a core 2_12.

FIG. 22 is a drawing illustrating a configuration example (modified example) of alarm setting information 232 based on the task setting information 233.

FIG. 23 is a drawing illustrating task information 333 that includes information of the worst-case execution time (WCET: the longest time required to execute a specific task) of a task according to a modified example.

DESCRIPTION OF EMBODIMENTS

Figure 1:
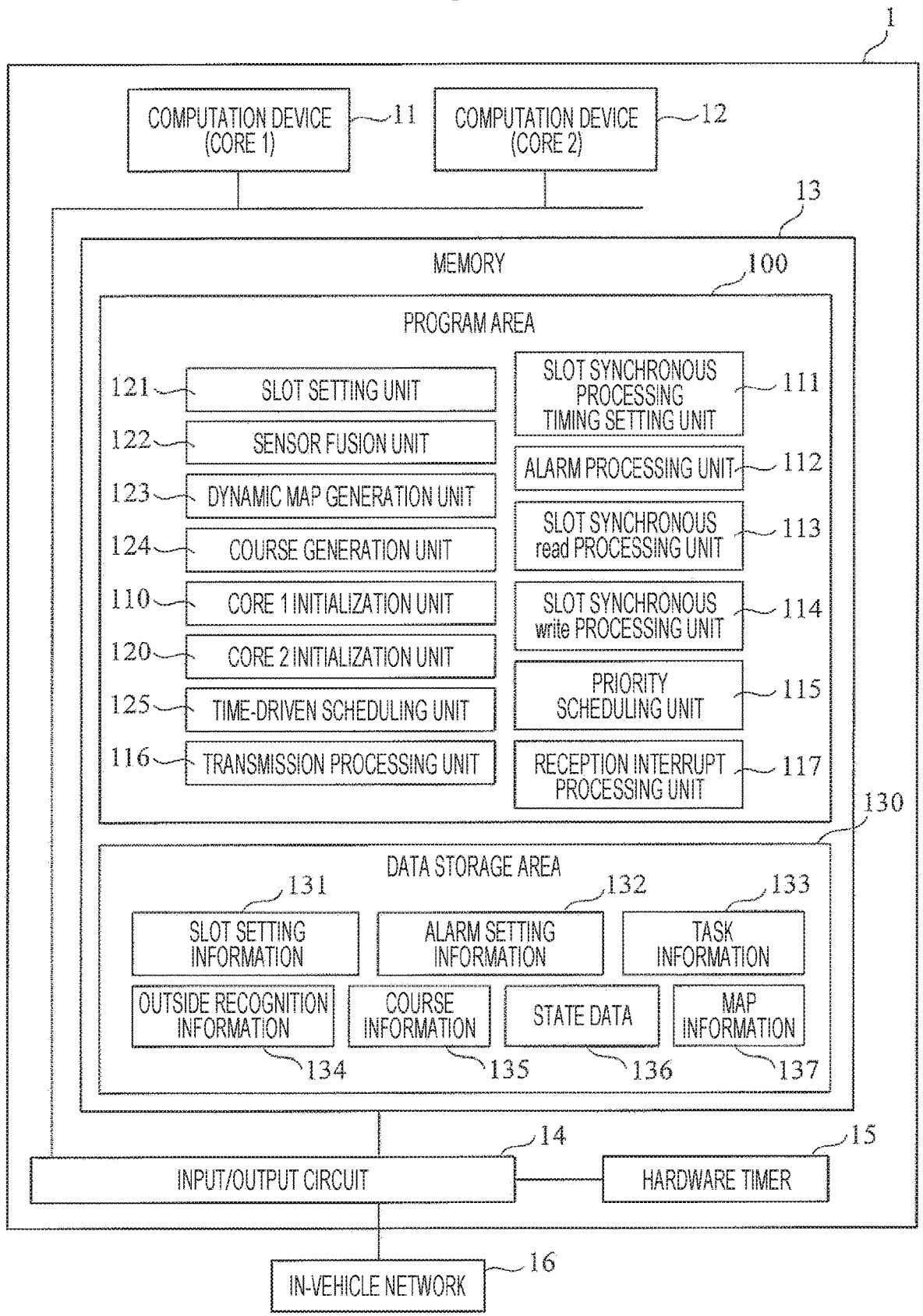
FIG. 1 is a diagram illustrating a schematic configuration of a vehicle control device 1 according to an embodiment of the present disclosure.

A vehicle control device according to the present disclosure executes time-driven scheduling and other scheduling algorithms in a multi-core environment, and performs inter-core communication in a non-interference manner between the scheduling algorithms, thereby achieving both high responsiveness to an interrupt request and non-interference between control software.

In the vehicle control device according to the present disclosure, a control application that is desired to be non-interference is executed by a core that is executed in a time division manner, and basic software that is desired to be highly responsive is executed by a core that is executed on the basis of a priority of a task. This enables to achieve both high responsiveness and non-interference. It should be noted that in the present description, time window is referred to as slot.

Embodiments of the present disclosure will be explained below with reference to the accompanying drawings. In the accompanying drawings, in some case, functionally the same components are denoted by the same reference numerals. It should be noted that although the accompanying drawings show specific embodiments and implementation examples conforming to the principles of the present disclosure, the accompanying drawings are presented for the understanding of the present disclosure, and are by no means used to limitedly construe the present disclosure.

The present embodiment is explained in detail sufficiently for those skilled in the art to carry out the present disclosure. However, it is necessary to understand that other implementations and forms are also possible, and changes of configurations and structures and replacement of various elements are possible without departing from the scope and the spirit of the technical idea of the present disclosure. Therefore, the subsequent statement should not be construed to be limited thereto.

Further, the embodiments of the present disclosure may be implemented as software running on a general-purpose computer or may be implemented as dedicated hardware or a combination of software and hardware.

Incidentally, in the following explanation, kinds of information of the present disclosure are explained according to a "table" format. However, these kinds of information do not always have to be represented in a data structure by a table, and may be represented in a data structure of a list, a DB, a queue, or the like or other structures. Therefore, in order to indicate that the information does not depend on the data structure, in some case, "table," "list," "DB," "queue" and the like are simply referred to as "information".

In addition, when contents of the kinds of information are explained, expressions such as "identification information", "identifier", "appellation", "name" and "ID" can be used. These expressions can be interchanged.

Kinds of processing in the embodiments of the present disclosure are explained below using "program" as a subject (an operation entity). However, since the program is executed by a processor to perform set processing using a memory and a communication port (a communication control device), the processing may be explained using the processor as a subject. A part or all of the program may be realized by dedicated hardware or may be formed as a module.

(1) First Embodiment

According to a first embodiment, there is disclosed a multi-core equipped vehicle control device in which, for example, one core (for example, a core 1) is caused to take charge of a task that should be executed by time division, and another core (for example, a core 2) is caused to take charge of a task that should be executed not by time division. Here, for example, an interrupt process such as communication is mentioned as a task executed not by time division. More specifically, the core 2 executes a task that should be cyclically executed in a set slot. The core 1 executes a task (an interrupt process) that is not cyclically executed in an available slot. The first embodiment will be described below in detail.

<Configuration of Vehicle Control Device>

FIG. 1 is a diagram illustrating a schematic configuration of the vehicle control device 1 according to the embodiment of the present disclosure.

(i) The vehicle control device 1 is provided with a computation device (core 1) 11, a computation device (core 2) 12, a memory 13, an input/output circuit 14, a hardware timer 15, and an in-vehicle network 16. In the present embodiment, although controller area network (CAN) is assumed as the in-vehicle network 16, the in-vehicle network 16 is not limited to this. The in-vehicle network 16 may be, for example, CANFD, FlexRay, serial communication or Ethernet. In addition, the number of computation devices is also not limited to two. The number of computation devices has only to be two or more. The memory 13 includes a program area 100, and a data storage area (in the present description, it may be called "shared data buffer") 130.

The program area 100 of the memory 13 includes, as various programs, the core 1 initialization unit 110, the slot synchronous processing timing setting unit 111, the alarm processing unit 112, the slot synchronous read processing unit 113, the slot synchronous write processing unit 114, the priority scheduling unit 115, the transmission processing unit 116, the reception interrupt processing unit 117, the core 2 initialization unit 120, the slot setting unit 121, the sensor fusion unit 122, the dynamic map generation unit 123, the course generation unit 124, and the time-driven scheduling unit 125.

The core 1 initialization unit 110, the slot synchronous processing timing setting unit 111, the alarm processing unit 112, the slot synchronous read processing unit 113, the slot synchronous write processing unit 114, the priority scheduling unit 115, the transmission processing unit 116, and the reception interrupt processing unit 117 are executed by the core 1_11. The slot setting unit 121, the sensor fusion unit 122, the dynamic map generation unit 123, the course generation unit 124, and the time-driven scheduling unit 125 are executed by the core 2_12. More specifically, the computation device (the core 1) 11 and the computation device (the core 2) 12 each read each program corresponding to processing in charge in a temporary buffer, and then execute each program by a processor such as a CPU (not illustrated).

The data storage area 130 stores the slot setting information 131, the alarm setting information 132, the task information 133, outside recognition information 134, course information 135, state data (for example, error information) 136, and map information 137.

The input/output circuit 14 communicates with the outside (for example, various apparatuses, various sensors, and the like, that are connected to the vehicle control device 1) through the in-vehicle network 16, thereby setting the hardware timer 15, and receiving an interrupt request from the hardware timer 15.

(ii) The core 1 initialization unit 110 executes initialization processing for the computation device (core 1) 11. The slot synchronous processing timing setting unit 111 executes processing of adjusting the timing between communication processing executed by the core 1_11 and processing executed by the core 2_12 (for example, sensor fusion processing, dynamic map generation processing, and course generation processing are included). The alarm processing unit 112 executes processing of setting a timer in such a manner that an interrupt process is executed in the timing set by the slot synchronous processing timing setting unit 111. The slot synchronous read processing unit 113 executes processing of reading predetermined data stored in the shared data buffer (the data storage area) 130 at the time set by the alarm processing unit 112. The slot synchronous write processing unit 114 executes processing of writing predetermined data to the shared data buffer (the data storage area) 130 at the time set by the alarm processing unit 112. The priority scheduling unit 115 executes processing of scheduling, on the basis of a priority, processing to be executed in an interrupt slot (an available slot) (including an interrupt process and time division processing). The transmission processing unit 116 executes processing of transmitting each data saved in the shared data buffer 130 to the core 2_12. The reception interrupt processing unit 117 executes processing of storing the outside recognition information 134 in a temporary buffer of the core 1_11 through the in-vehicle network 16. It should be noted that the temporary buffer may be the temporary buffer of the core 2_12, or may be the temporary buffer in the memory 13 if the temporary buffer is provided in the memory 13.

The core 2 initialization unit 120 executes initialization processing for the computation device (core 2) 12. The slot setting unit 121 reads the slot setting information 131 at the time of initialization processing, and then executes processing of recognizing a configuration of a slot. The sensor fusion unit 122 obtains external information by various sensors (for example, a camera and a radar), and executes processing of recognizing a forward state on the basis of each piece of external information. The dynamic map generation unit 123 executes processing of reflecting the forward state recognized by the sensor fusion unit 122 in the map information. The course generation unit 124 executes processing of determining an applicable course on the basis of information related to the forward state obtained by the sensor fusion unit 122. The time-driven scheduling unit 125 executes processing of switching a slot.

<Configuration Example of Slot Setting Information>

Figures 2, 3:
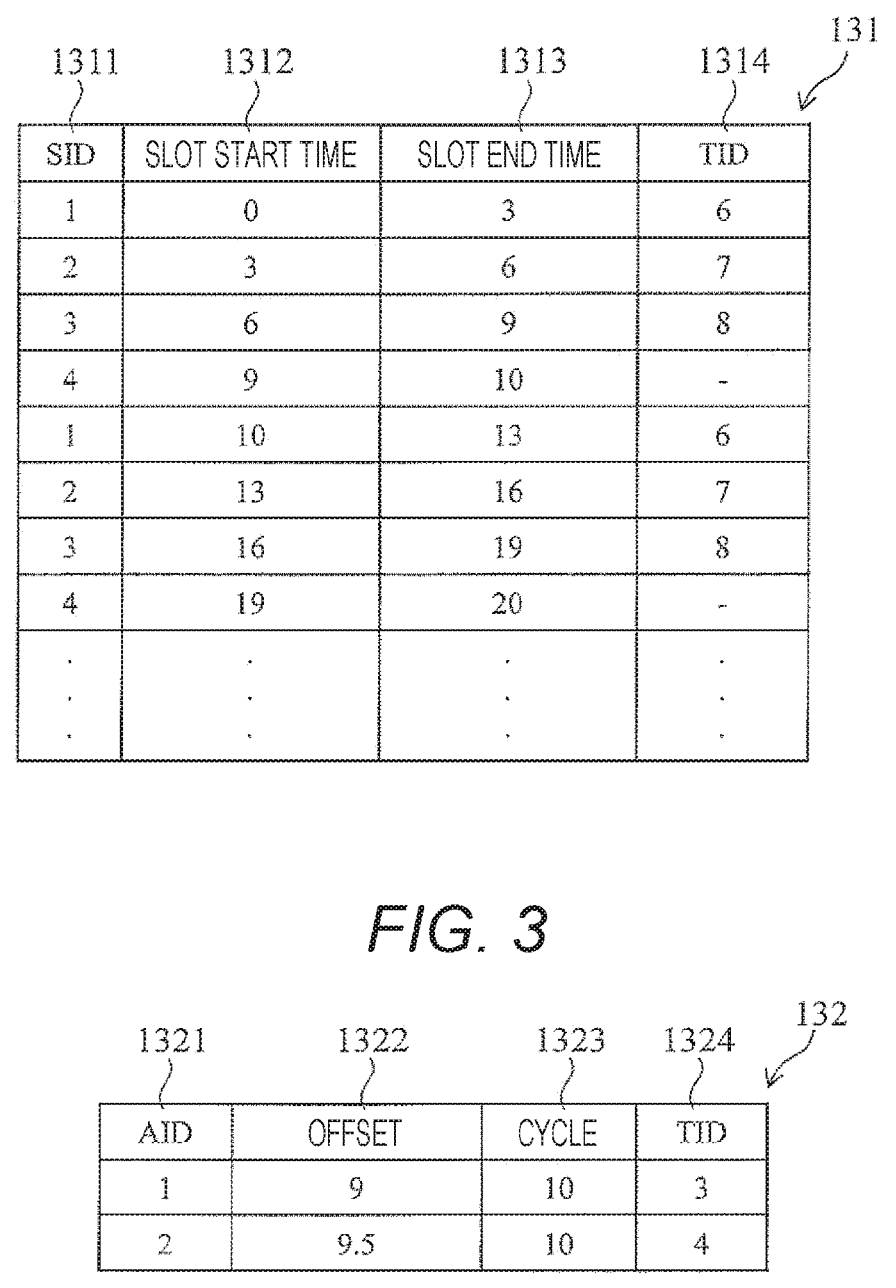

FIG. 2 is a drawing illustrating a configuration example of the slot setting information 131 according to the present embodiment. The slot setting information 131 includes, as configuration items, a SID 1311, slot start time 1312, slot end time 1313, and a TID 1314.

The SID 1311 is identification information (ID) that is capable of uniquely identifying/specifying a slot.

The slot start time 1312 is information that indicates the start time of each slot in units of ms.

The slot end time 1313 is information that indicates the end time of each slot in units of ms. It should be noted that in the present embodiment, although the time is represented in units of ms, the representation of the time is not limited to this.

The TID 1314 is identification information (ID) that is capable of uniquely identifying/specifying a task to be executed. It should be noted that in the present embodiment, although only one task is assigned to one slot, the task assignment is not limited to this. For example, two or more tasks may be assigned to one slot.

In addition, in the present embodiment, a system cycle of 10 ms is assumed. In other words, when the time progresses up to 10 ms, the time returns to 0 ms. Here, although the system cycle is 10 ms, the system cycle is not limited to this. For example, the system cycle may be 50 ms or 100 ms. Moreover, the TID 1314 having a value of "-" means an available slot.

In the present embodiment, available slot information is described in the slot setting information 131. However, it is not always necessary to describe the available slot information in the slot setting information 131. In such a case, an available slot can be searched for by checking the time to which a slot is not assigned, or a slot to which a task is not assigned, in a system cycle.

<Configuration Example of Alarm Setting Information>

FIG. 3 is a drawing illustrating a configuration example of the alarm setting information 132 according to the present embodiment. The alarm setting information 132 includes, as configuration items, an AID 1321, an offset 1322, a cycle 1323, and a TID 1324.

The AID 1321 is identification information (ID) that is capable of uniquely identifying/specifying an alarm. Here, the alarm is a service provided by an operating system. Processing in which a hardware timer interrupt is caused to occur at the specified time to execute a specific task is assumed.

The offset 1322 is information that represents a deviation from the reference time of the alarm time. For example, an offset value of 9 represents the time advanced by 9 ms from 0 ms.

The cycle 1323 represents a cycle in which an alarm is set again. For example, in a case where the offset is 9 and the cycle is 10, a hardware timer interrupt occurs at 9 ms in a 10 ms cycle. This means that an alarm is set in such a manner that an alarm is generated in the 10 ms cycle.

The TID 1324 indicates a task ID of a task executed by an alarm.

According to an example shown in FIG. 3, at 9 ms (when the SID 1311 is 4: refer to FIG. 2), a task 3 (slot synchronous read processing) is subjected to interrupt processing; and at 9.5 ms, a task 4 (slot synchronous write processing) is subjected to interrupt processing.

<Configuration Example of Task Information>

Figure 4:
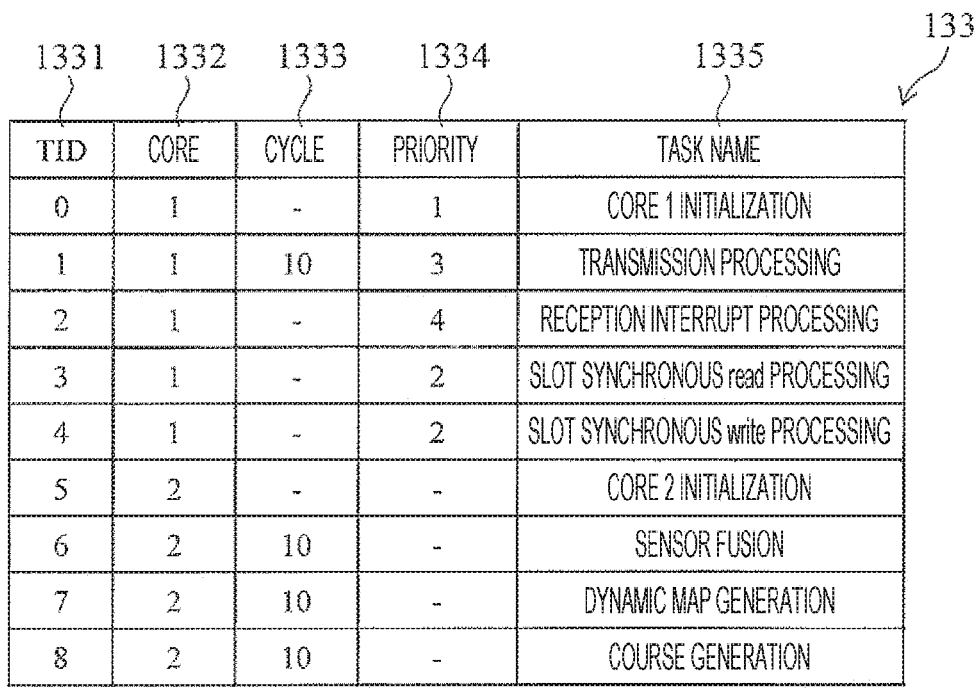
FIG. 4 is a drawing illustrating a configuration example of task information 133 according to the present embodiment.

FIG. 4 is a drawing illustrating a configuration example of the task information 133 according to the present embodiment. The task information 133 includes, as configuration information, a TID 1331, a core 1332, a cycle 1333, a priority 1334, and a task name 1335.

The TID 1331 is task identification information (ID) that is capable of uniquely identifying/specifying a task.

The core 1332 is identification information (ID) of a core that executes the target TID 1331. For example, if the core 1332 has a value of 1, this means that a task corresponding to the target TID 1331 or an interrupt process is executed by the computation device (the core 1) 11.

The cycle 1333 is information that indicates an execution cycle of a target task. A task having a number in the corresponding column is a cyclic task. A task having no cycle number is a task executed only at the time of initialization, an interrupt process started on receipt of an interrupt request, or a task or an interrupt process that is started by a specific timer interrupt. Incidentally, in the present embodiment, all of processes taken charge of by the core 2_12 are cyclic tasks (processes executed by time division), and processes taken charge of by the core 1_11 are interrupt processes with the exception of transmission processing.

The priority 1334 is information that indicates a priority of a task or an interrupt process. In the present embodiment, it is indicated that the priority gets higher with the decrease in number. In a case where a plurality of tasks or interrupt processes are executed at the same time of day, the priority scheduling unit 115 executes one in which the priority 1334 is higher. For example, in the case of a process to be executed by time division, it is not always necessary to set information of the priority 1334.

The task name 1335 indicates a name of a task. It should be noted that as task names, core 1 initialization means the core 1 initialization unit 110, transmission processing means the transmission processing unit 116, reception interrupt processing means the reception interrupt processing unit 117, slot synchronous read processing means the slot synchronous read processing unit 113, slot synchronous write processing means the slot synchronous write processing unit 114, core 2 initialization means the core 2 initialization unit 120, sensor fusion means the sensor fusion unit 122, dynamic map generation means the dynamic map generation unit 123, and course generation means the course generation unit 124.

<Outline of Overall Processing>

Figure 5:
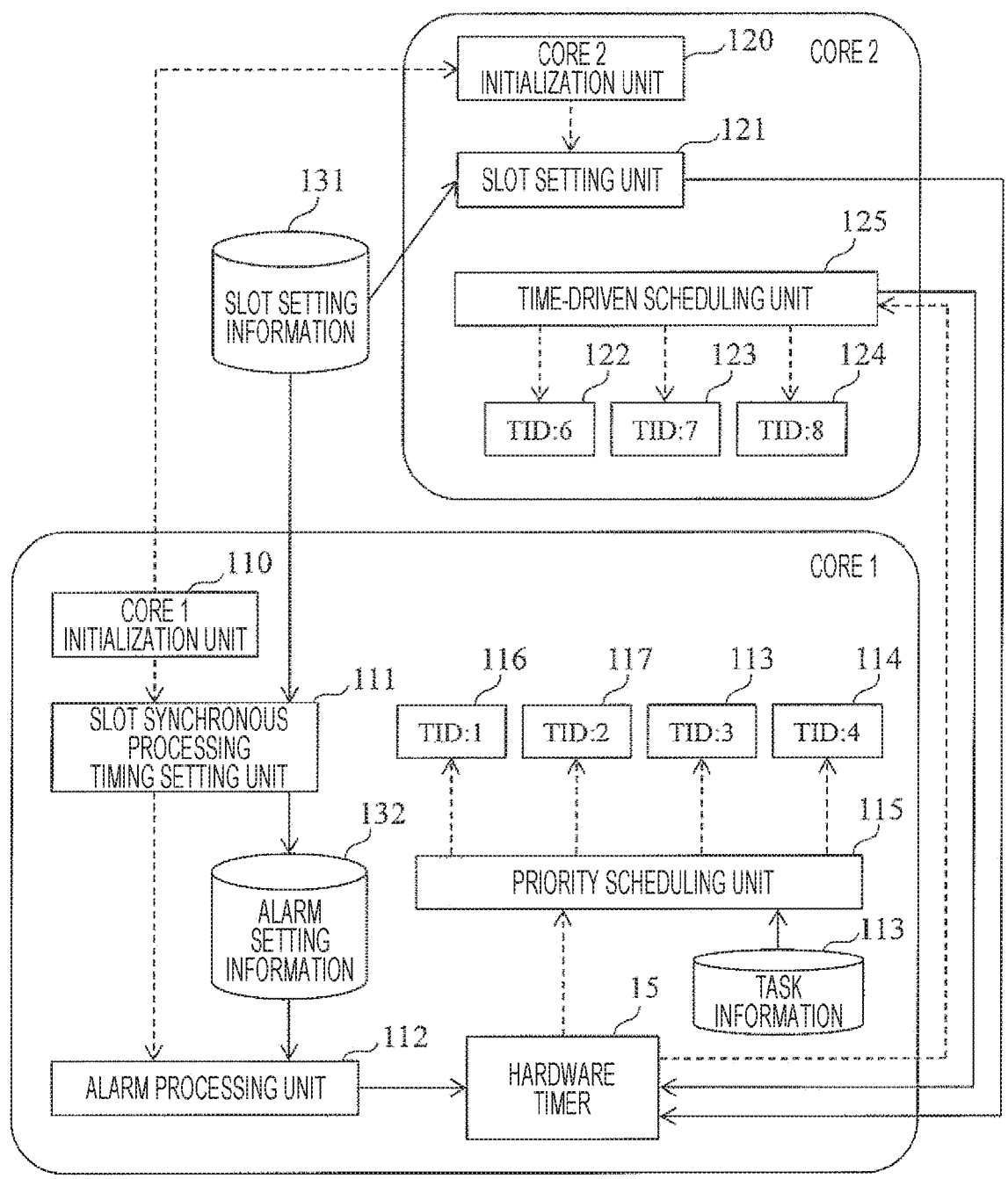
FIG. 5 is an operation explanatory drawing illustrating an outline of overall processing according to the present embodiment.

FIG. 5 is an operation explanatory drawing illustrating an outline of overall processing according to the present embodiment. In FIG. 5, a solid line indicates a flow of data, and a dotted line indicates a flow of execution of processing.

When a system is started up, the core 1 initialization unit 110 of the core 1_11 is first executed. Next, the core 2 initialization unit 120 of the core 2_12 and the slot synchronous processing timing setting unit 111 are executed.

The slot synchronous processing timing setting unit 111 refers to the slot setting information 131 to detect an available slot. Subsequently, the slot synchronous processing timing setting unit 111 saves task contents in the alarm setting information 132 in such a manner that a process (task) that is desired to be executed can be executed at the time of the detected available slot, and then calls the alarm processing unit 112.

The alarm processing unit 112 sets the time in the hardware timer 15 in such a manner that a specific process is executed at the time described in the alarm setting information 132.

The priority scheduling unit 115 executes a task to be executed by the core 1_11, or an interrupt process, on the basis of a priority. Processing to be executed by the core 1_11 corresponds to the transmission processing unit 116, the reception interrupt processing unit 117, the slot synchronous read processing unit 113, and the slot synchronous write processing unit 114. Incidentally, since requests of all interrupt processes are not always made, interrupt requests that are being issued at that point of time, and processes (time division processes) that should be cyclically executed, are scheduled on the basis of priorities. If no interrupt request is made, only transmission processing that is cyclically executed is scheduled.

The slot synchronous read processing unit 113 and the slot synchronous write processing unit 114 are started by the hardware timer 15 set by the alarm processing unit 112. The priority scheduling unit 115 executes processes thereof on the basis of the priority 1334 described in the task information 133.

The core 2 initialization unit 120 of the core 2_12 calls the slot setting unit 121. The slot setting unit 121 performs settings of the hardware timer 15 in such a manner that the time-driven scheduling unit 125 is executed on the basis of the slot setting information 131.

The time-driven scheduling unit 125 is started by the hardware timer 15, and executes a process corresponding to a slot. In the present embodiment, the sensor fusion unit 122, the dynamic map generation unit 123, and the course generation unit 124 are executed by the time-driven scheduling unit 125.

The operation of each processing unit shown in FIG. 5 will be described in detail below.

<Details of Core 1 Initialization Processing>

Figure 6:
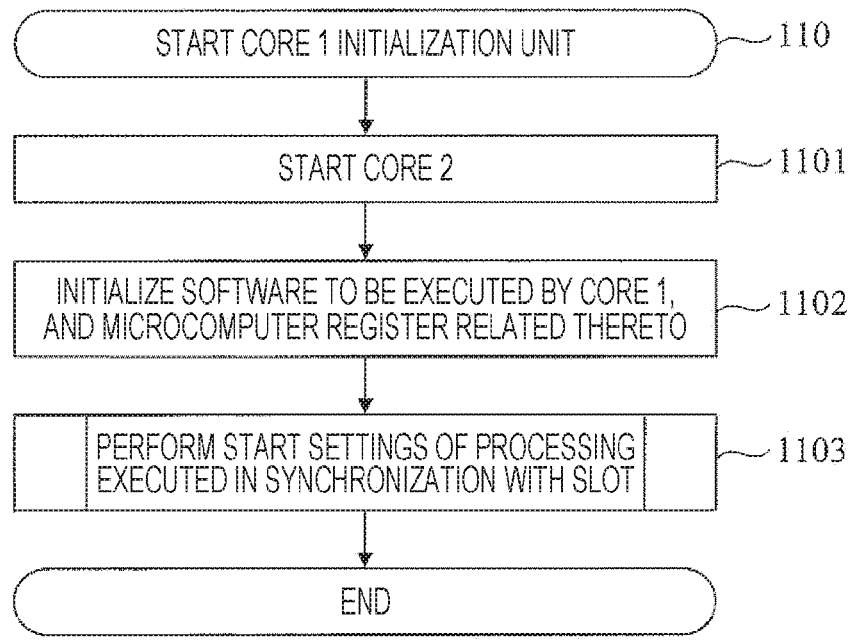
FIG. 6 is a flowchart illustrating processing contents of a core 1 initialization unit 110 according to the present embodiment.

FIG. 6 is a flowchart illustrating processing contents of the core 1 initialization unit 110 according to the present embodiment. Here, processing contents are explained using the core 1 initialization unit 110 as an operation entity. However, since the core 1 initialization unit 110 is a program executed by the core 1_11, the core 1_11 or a processor included in the core 1_11 may be used as an operation entity. The same applies to the slot synchronous read processing unit 113, the slot synchronous write processing unit 114, the priority scheduling unit 115, the transmission processing unit 116, and the reception interrupt processing unit 117 described below.

(i) Step 1101

The core 1 initialization unit 110 starts the core 2_12.

(ii) Step 1102

The core 1 initialization unit 110 initializes software executed by the core 1_11, and a microcomputer register associated therewith.

(iii) Step 1103

The core 1 initialization unit 110 calls the slot synchronous processing timing setting unit 111 so as to perform start settings of a process to be executed in synchronization with a slot. Further details of step 1103 will be explained in FIG. 7.

<Slot Synchronous Processing Timing Setting Processing: Details of Step 1103>

Figure 7:
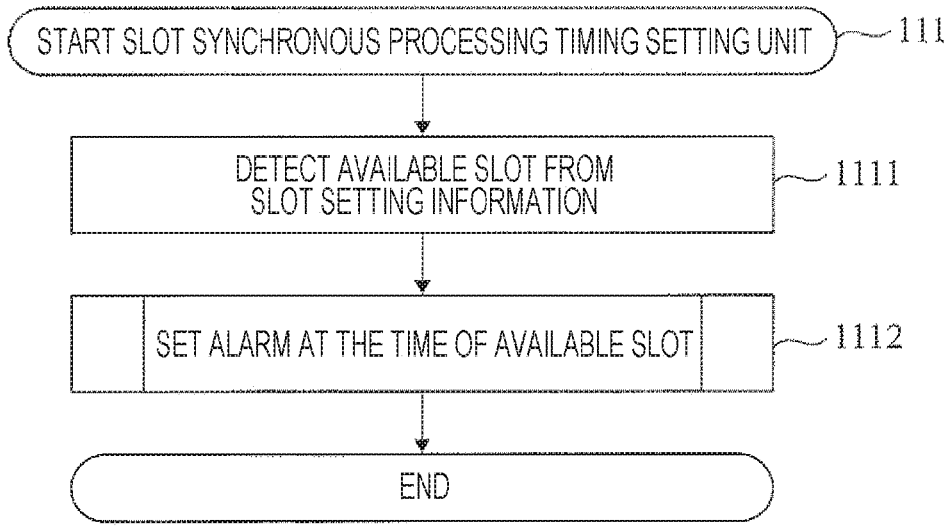
FIG. 7 is a flowchart illustrating, in detail, processing (step 1103) by a slot synchronous processing timing setting unit 111.

FIG. 7 is a flowchart illustrating, in detail, processing (step 1103) by the slot synchronous processing timing setting unit 111. Since this processing is included in the initialization processing, the processing is executed only once at the time of initialization.

(i) Step 1111

The slot synchronous processing timing setting unit 111 detects an available slot from the slot setting information 131. For example, in the present embodiment, a slot, the SID 1311 of which is 4, has no registered task in the TID 1314, and therefore it is shown that the slot is an available slot. In the present embodiment, although an obvious available slot is clearly shown in the slot setting information 131, an available slot is not limited to this. For example, the time of a slot in which no task is executed is calculated from a system cycle, and from information of the SID 1311 from 1 to 3, and the slot may be determined to be an available slot.

(ii) Step 1112

In order to start a task corresponding to a slot at the time of the available slot, the slot synchronous processing timing setting unit 111 calls the alarm processing unit 112 with the task ID corresponding to the start time of the available slot used as an argument, and causes the alarm processing unit 112 to execute time setting processing.

<Alarm Processing: Details of Step 1112>

Figure 8:
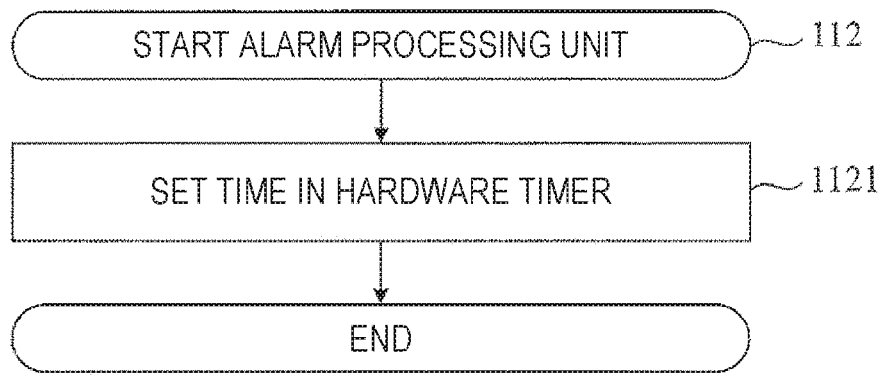
FIG. 8 is a flowchart illustrating, in detail, processing (step 1112) by an alarm processing unit 112.

FIG. 8 is a flowchart illustrating, in detail, processing (step 1112) by the alarm processing unit 112.

(i) Step 1121

The alarm processing unit 112 sets the time in the hardware timer 15 in such a manner that the task ID corresponding to the time, which is the argument, starts.

<Details of Slot Synchronous Read Processing>

Figure 9:
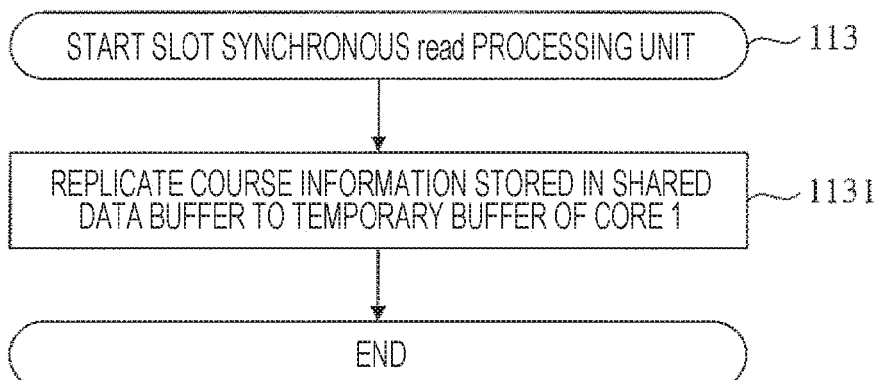
FIG. 9 is a flowchart illustrating, in detail, processing by a slot synchronous read processing unit 113.

FIG. 9 is a flowchart illustrating, in detail, processing by the slot synchronous read processing unit 113.

(i) Step 1131

The slot synchronous read processing unit 113 is started by the hardware timer 15, and replicates the course information 135 stored in the shared data buffer (the data storage area) 130 to a temporary buffer of the core 1_11. The course information 135 is generated by the core 2_12 (the course generation unit 124), and is stored in the shared data buffer 130. Subsequently, the core 1_11 outputs the course information 135 that has been taken into the temporary buffer to the in-vehicle network 16 by transmission processing. It should be noted that the temporary buffer may be the temporary buffer of the core 2_12, or may be the temporary buffer in the memory 13 if the temporary buffer is provided in the memory 13.

<Details of Slot Synchronous Write Processing>

Figure 10:
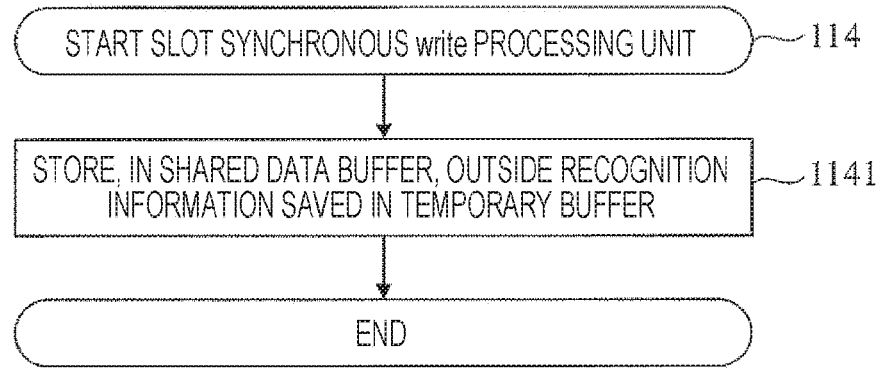
FIG. 10 is a flowchart illustrating, in detail, processing by a slot synchronous write processing unit 114.

FIG. 10 is a flowchart illustrating, in detail, processing by the slot synchronous write processing unit 114.

(i) Step 1141

The slot synchronous write processing unit 114 is started by the hardware timer 15, and stores the outside recognition information 134 saved in a temporary buffer of the core 1_11 in the shared data buffer (data storage area) 130. In other words, although the outside recognition information (sensing data) 134 is obtained by various sensors (a camera and a radar: not illustrated), this information is obtained through the in-vehicle network 16, is written to the temporary buffer of the core 1_11, and is then stored in the shared data buffer 130.

<Details of Priority Scheduling Processing>

Figure 11:
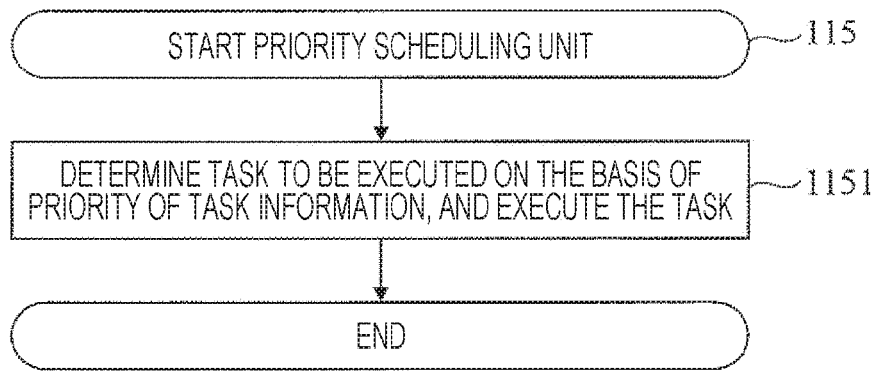
FIG. 11 is a flowchart illustrating, in detail, processing by a priority scheduling unit 115.

FIG. 11 is a flowchart illustrating, in detail, processing by the priority scheduling unit 115.

(i) Step 1151

The priority scheduling unit 115 determines a schedule of a task to be executed on the basis of the priority 1334 of the task information 133, and instructs a corresponding processing unit (for example, in the case of transmission processing, the transmission processing unit 116, and in the case of reception interrupt processing, the reception interrupt processing unit 117, etc.) to carry out the execution in such a manner that each processing is executed on the basis of the schedule.

<Details of Transmission Processing>

Figure 12:
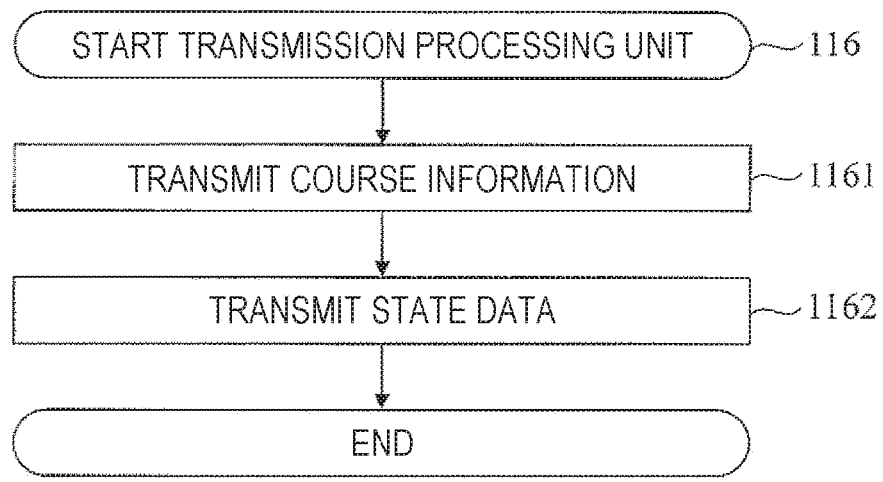
FIG. 12 is a flowchart illustrating, in detail, processing by a transmission processing unit 116.

FIG. 12 is a flowchart illustrating, in detail, processing by the transmission processing unit 116.

(i) Step 1161

The transmission processing unit 116 transmits the course information 135 currently saved in the temporary buffer of the core 1_11 to the outside (for example, other ECUs or inspection devices, etc.) of the vehicle control device 1 through the in-vehicle network 16.

(ii) Step 1162

The transmission processing unit 116 transmits the state data 136 currently saved in the temporary buffer of the core 1_11 to the outside (for example, other ECUs or inspection devices, etc.) of the vehicle control device 1 through the in-vehicle network 16.

<Details of Reception Interrupt Processing>

Figure 13:
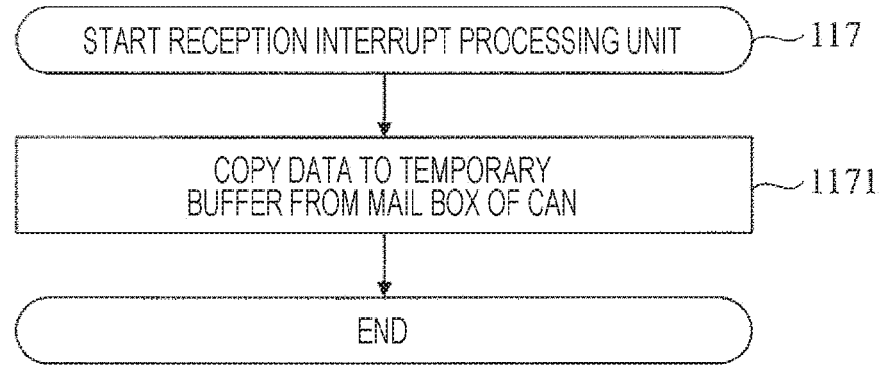
FIG. 13 is a flowchart illustrating, in detail, processing by a reception interrupt processing unit 117.

FIG. 13 is a flowchart illustrating, in detail, processing by the reception interrupt processing unit 117.

(i) Step 1171

The reception interrupt processing unit 117 copies the outside recognition information 134 from a mail box of the in-vehicle network 16 (for example, CAN) to the temporary buffer of the core 1_11. At this point of time, the reception interrupt processing unit 117 gives, to the outside recognition information 134, information (time stamp) of the time at which copying has been carried out, before storing the outside recognition information 134 in the temporary buffer. The information of the time is used by the sensor fusion unit 122. It should be noted that the temporary buffer may be the temporary buffer of the core 2_12, or may be the temporary buffer in the memory 13 if the temporary buffer is provided in the memory 13.

Taking the sensor fusion unit 122 as an example, an obtainment time axis of the outside recognition information 134 obtained by a camera or a radar differs from a processing time axis of the sensor fusion unit 122. However, performing computation without aligning the different time axes to each other results in existence of two vehicles, and therefore it is necessary to align the outside time axis to the inside time axis. Accordingly, a time stamp is given when the outside recognition information 134 is received, which enables to treat information as data on the same time axis.

<Details of Core 2 Initialization Processing>

Figure 14:
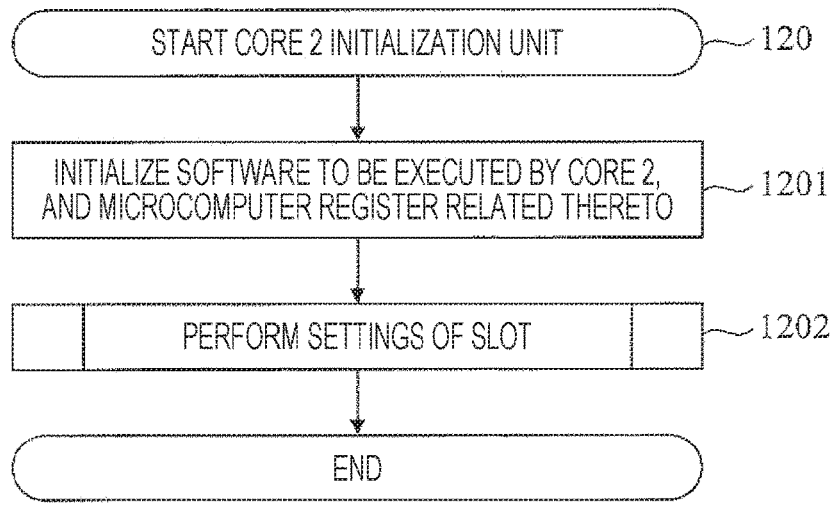
FIG. 14 is a flowchart illustrating, in detail, processing by a core 2 initialization unit 120.

FIG. 14 is a flowchart illustrating, in detail, processing by the core 2 initialization unit 120. Here, processing contents are explained using the core 2 initialization unit 120 as an operation entity. However, since the core 2 initialization unit 120 is a program executed by the core 2_12, the core 2_12 or a processor included in the core 2_12 may be used as an operation entity. The same applies to the sensor fusion unit 122, the dynamic map generation unit 123, the course generation unit 124, and the time-driven scheduling unit 125 described below.

(i) Step 1201

The core 2 initialization unit 120 initializes software used by the core 2, and a microcomputer register related thereto.

(ii) Step 1202

In order to set a slot, the core 2 initialization unit 120 calls the slot setting unit 121, and instructs the slot setting unit 121 to execute slot setting processing.

<Details of Slot Setting Processing>

Figure 15:
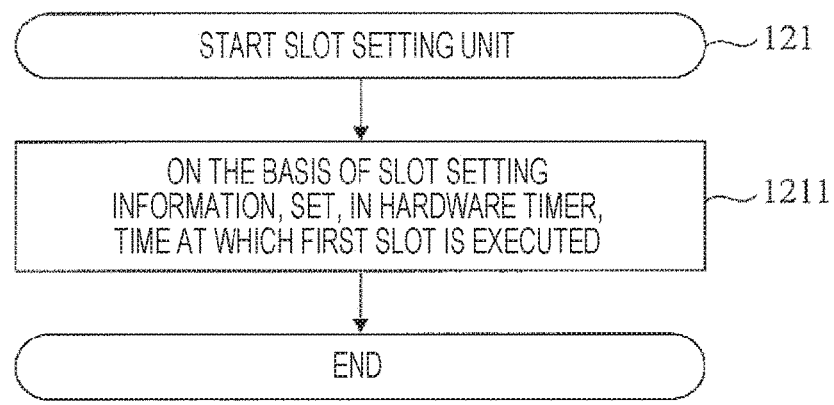
FIG. 15 is a flowchart illustrating, in detail, processing by a slot setting unit 121.

FIG. 15 is a flowchart illustrating, in detail, processing by the slot setting unit 121. Since this processing is included in the initialization processing, the processing is executed only once at the time of initialization.

(i) Step 1211

On the basis of the slot setting information 131, the slot setting unit 121 sets, in the hardware timer 15, the time at which the first slot is executed.

<Details of Sensor Fusion Processing>

Figure 16:
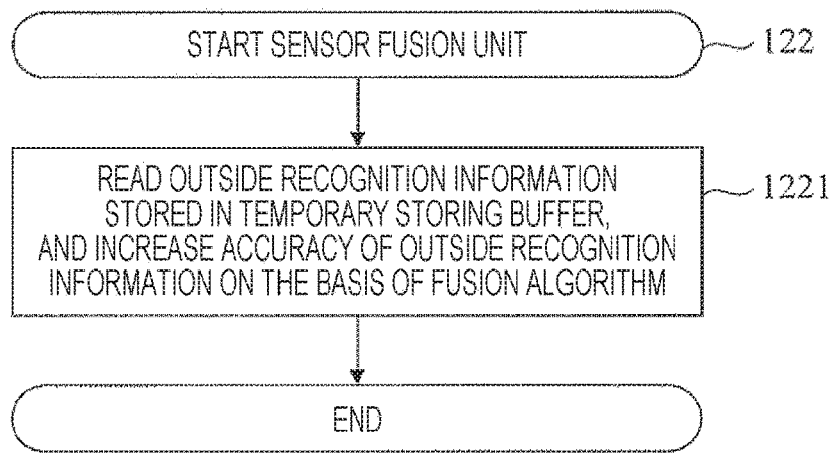
FIG. 16 is a flowchart illustrating, in detail, processing by a sensor fusion unit 122.

FIG. 16 is a flowchart illustrating, in detail, processing by the sensor fusion unit 122.

(i) Step 1221

The sensor fusion unit 122 is started in synchronization with a corresponding slot, reads the outside recognition information 134 stored in the shared data buffer 130, and increases the accuracy of the outside recognition information on the basis of a fusion algorithm. In other words, the detection accuracy is enhanced by using a plurality of kinds of information obtained by a plurality of sensors such as a camera (that is suitable for recognizing a size of an object), and a radar (that is suitable for recognizing a distance from the object).

<Details of Dynamic Map Generation Processing>

Figure 17:
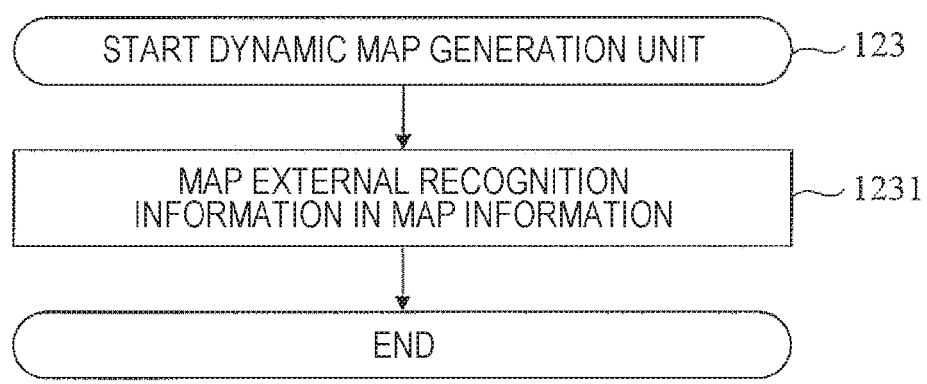
FIG. 17 is a flowchart illustrating, in detail, processing by a dynamic map generation unit 123.

FIG. 17 is a flowchart illustrating, in detail, processing by the dynamic map generation unit 123.

(i) Step 1231

The dynamic map generation unit 123 is started in synchronization with a corresponding slot. The dynamic map generation unit 123 maps position information of an object, which is indicated by the outside recognition information 134, to the map information 137 so as to enable understanding of the properties and distance of the object, the predicted operation thereof, and the like.

<Details of Course Generation Processing>

Figure 18:
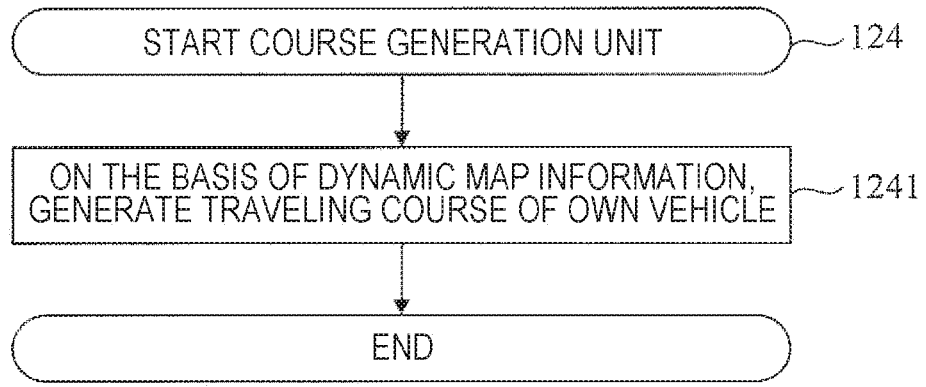
FIG. 18 is a flowchart illustrating, in detail, processing by a course generation unit 124.

FIG. 18 is a flowchart illustrating, in detail, processing by the course generation unit 124.

(i) Step 1241

The course generation unit 124 is started in synchronization with a corresponding slot. The course generation unit 124 generates a traveling course of an own vehicle on the basis of dynamic map information generated by the dynamic map generation unit 123, and then saves the traveling course in the course information 135 of the shared data buffer 130.

<Details of Time-Driven Scheduling Processing>

Figure 19:
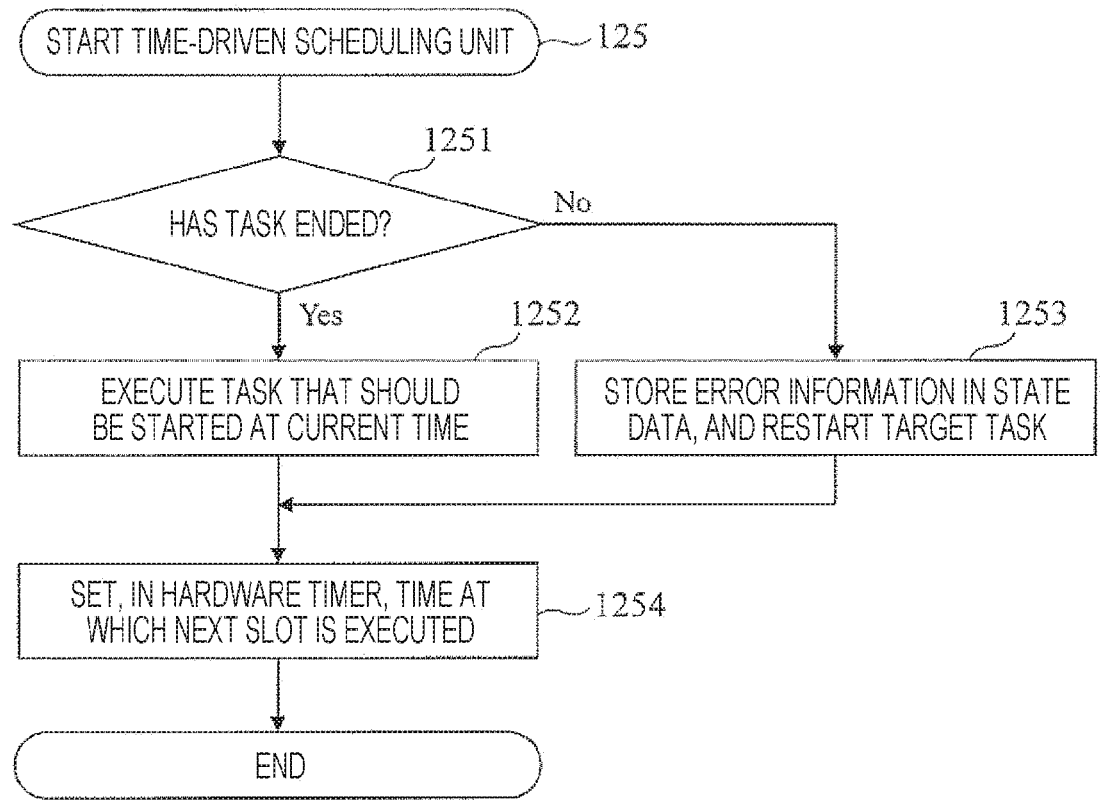
FIG. 19 is a flowchart illustrating, in detail, processing by a time-driven scheduling unit 125.

FIG. 19 is a flowchart illustrating, in detail, processing by the time-driven scheduling unit 125.

(i) Step 1251

The time-driven scheduling unit 125 determines whether or not a current task executed in the slot is still being executed at a point of time at which the slot to be checked ends. In a case where the task has ended (in the case of Yes in step 1251), the processing proceeds to step 1252. In a case where the task is still being executed (in the case of No, in step 1251), the processing proceeds to step 1253.

(ii) Step 1252

The time-driven scheduling unit 125 instructs a corresponding processing unit (for example, the course generation unit 124, etc.) to execute a task that should be started at the current time.

(iii) Step 1253

The time-driven scheduling unit 125 stores error information in the state data 136 of the shared data buffer 130, and causes a target task to restart (recover). The timing of restarting can be, for example, the start time of the corresponding slot in the next cycle.

In the present embodiment, in a case where the task is still being executed when the slot ends, error information is saved, and the task that is being executed is restarted. However, the method is not limited to this. For example, merely forcibly terminating the task also suffices. Alternatively, after the error information is saved, the task may be continuously executed in the next slot. Moreover, the task may be continuously executed in the next slot without saving the error information. This method is used when one task is executed over a plurality of slots.

(iv) Step 1254

The time-driven scheduling unit 125 sets, in the hardware timer 15, the time at which the next slot is executed.

<Processing Timing>

Figure 20:
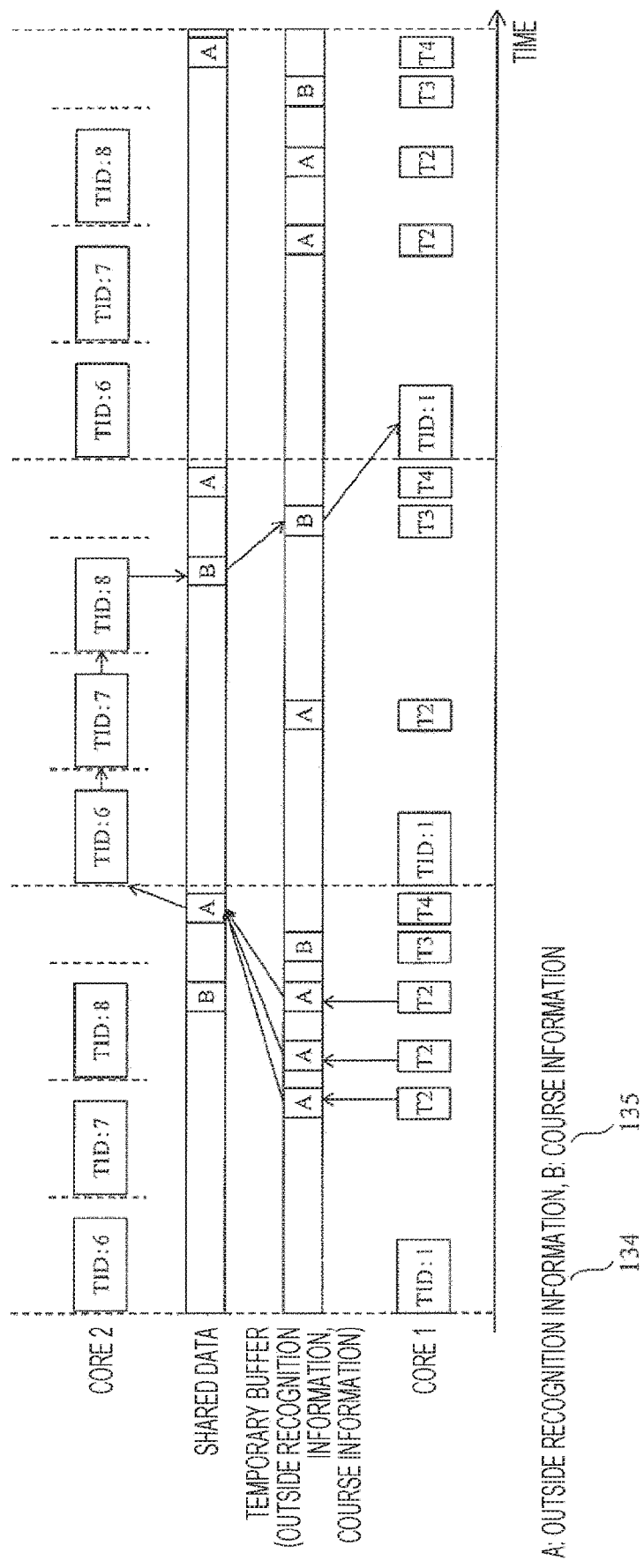
FIG. 20 is a timing chart illustrating the timing of each processing executed by the vehicle control device 1 according to the present embodiment.

FIG. 20 is a timing chart illustrating the timing of each processing executed by the vehicle control device 1 according to the present embodiment. In FIG. 20, arrows each indicate a flow of data, and are only partially shown for convenience of explanation.

The outside recognition information 134 received through the in-vehicle network 16 is received by the reception interrupt processing unit 117 of TID:2 (T2: interrupt process), and is saved in the temporary buffer (the temporary buffer in the core 1_11, the temporary buffer in the core 2_12 or the temporary buffer in the memory 13).

The slot synchronous write processing unit 114 of TID:4 is started in an available slot, and copies the outside recognition information 134 from the temporary buffer to the shared data buffer 130.

The outside recognition information 134 is processed by the sensor fusion unit 122 of TID:6, and the computation result is referred to by the dynamic map generation unit 123 of TID:7. In addition, the course generation unit 124 of TID:8 saves the course information 135 in the shared data buffer 130 on the basis of dynamic map information.

The slot synchronous read processing unit 113 of TID:3 copies the course information 135 stored in the shared data buffer 130 to the temporary buffer of the core 1_11.

In addition, in the transmission processing of TID:1, the transmission processing unit 116 transmits the course information 135 to other ECUs or inspection devices through the in-vehicle network 16. It should be noted that although the course information 135 is directly saved from the core 2_12 in the shared data buffer 130 in the present embodiment, the method is not limited to this. For example, the course information 135 may be saved in the shared data buffer 130 after the course information 135 is saved in a temporary saving buffer of the core 2_12 once.

(2) MODIFIED EXAMPLES: OTHER EMBODIMENTS

(i) Modified Example 1

In the first embodiment, time division is realized by time-driven scheduling. However, a method for realizing time division is not limited to the time-driven scheduling. For example, even in the case of priority scheduling, time division can be realized by executing processing so as to avoid overlapping, and by increasing a priority of slot processing to ensure that the processing is executed without fail. By using the start time of a slot as an offset of a task, by defining a size of the slot as a dead line, and by providing a task execution monitoring function of monitoring them, a task that has not ended can be detected at the time of slotting.

For example, FIG. 21 is a drawing illustrating a configuration example (modified example) of the task information 233 used when time division is executed according to priority scheduling even by the core 2_12. In addition, FIG. 22 is a drawing illustrating a configuration example (modified example) of the alarm setting information 232 based on the task setting information 233.

In the task information 233 shown in FIG. 21, a higher priority (priority 1) in comparison with TID:6 to 8 in the task information 133 (refer to FIG. 4) is newly set. In addition, the start time of a slot is set in an offset 2336, and a size of the slot is set in a dead line 2337. As described above, information of the dead line 2337 is used when a slot is set.

Moreover, in the alarm setting information 232 shown in FIG. 22, AID:3 to 5 are added in comparison with the alarm setting information 132 (refer to FIG. 3) according to the first embodiment.

As described above, the priority scheduling processing enables to realize time division processing.

(ii) Modified Example 2

In the first embodiment, the slot setting information 131 (refer to FIG. 2) is given. However, the slot setting information may be calculated from the task information when the system is started up. FIG. 23 is a drawing illustrating the task information 333 that includes information of the worst-case execution time (WCET: the longest time required to execute a specific task) of a task according to a modified example. In FIG. 23, WCET of tasks having TID:6 to 8 respectively are known. Therefore, a slot size is determined so as not to exceed the WCET, and a slot is shifted so as to prevent slots from overlap each other, thereby enabling to automatically generate slot setting information. For example, the core 1_11 or the core 2_12 determines a slot size in such a manner that the slot size becomes a value equivalent to the worst-case execution time+a margin (for example, 500 ms), and continues processing with the slot size fixed to the value. However, in such a case where the worst-case execution time is changed due to, for example, a change of algorithm or the like, a slot size may be set again after restarting the system.

(iii) Modified Example 3

In the first embodiment, the core 1_11 takes charge of the replication processing from the shared data buffer (data storage area) 130 to the temporary buffer of the core 1_11. However, a core that takes charge of the replication processing is not limited to the core 1_11. For example, the core 2_12 may carry out the replication processing in an available slot.

(iv) Modified Example 4

In the first embodiment, the core 1_11 stores data saved in the temporary buffer of the core 1_11 in the shared data buffer. However, a core that carries out data storing processing is not limited to the core 1_11. For example, the core 2_12 may carry out the data storing processing in an available slot.

(v) Modified Example 5

In the first embodiment, in a core that executes time division processing, one task is assigned to one slot. However, the number of slots to which one task is assigned is not limited to one. For example, one task may be assigned to a plurality of slots in a system cycle. In this case, it is necessary to assign a task in a system cycle in such a manner that an executed task does not exceed the last slot. In a case where a task exceeds the last slot, the processing results in an error (a processing time error). In addition, through the in-vehicle network 16, the error is transmitted (notified of) to other control devices (ECU), output devices (for example, a monitor, a meter, etc.), inspection devices or the like, which are connected to the vehicle control device 1.

(vi) Modified Example 6

In the first embodiment, in a core that executes time division processing, one task is assigned to one slot. However, the number of slots to which one task is assigned is not limited to one. For example, a plurality of tasks may be assigned in a slot to which time division processing is assigned, so as to execute processing by priority scheduling.

(vii) Modified Example 7

In the first embodiment, the same hardware timer 15 is referred to. Therefore, the time can be synchronized between multiple cores. However, a time synchronization method is not limited to this method.

(viii) Modified Example 8

In the first embodiment, a task is not executed in an available slot. However, a method is not limited to this. Processing is allowed in an available slot so long as write or read processing between cores does not occur in the available slot. Therefore, for example, microcomputer diagnostic processing, or control software that refers to data in the same core to output the result of calculation, may be executed.

While one core is reading data from the shared data buffer 130 (while read processing is performed), if another core writes data to the shared data buffer 130 by write processing, the data in the shared data buffer 130 is changed. Therefore, there is a possibility that read processing will not be properly executed (the read processing is brought into a state in which a bug has occurred in the data). Therefore, in a case where a slot is defined as an available slot, it is essential that the shared data buffer 130 is not accessed.

Incidentally, the available slot is a slot to which no time division process is assigned. However, even if a time division process is assigned to a slot, the slot may be treated as an available slot so long as no process in which read processing and write processing are executed is assigned to the shared data buffer 130.

(ix) Modified Example 9

In the first embodiment, only one available slot is provided in a system cycle. However, the number of available slots provided in the system cycle is not limited to one. For example, two or more available slots may be provided.

(x) Modified Example 10

In the first embodiment, writing and reading of data shared between cores are performed in an available slot. However, a method is not limited to this. Writing and reading of data shared between cores may be performed by finding an available time in units of data accesses, each of which is smaller than a slot, or may be performed over a plurality of slots.

(xi) Modified Example 11

In the first embodiment, the timing in which write processing or read processing is executed for data shared between cores is managed by the hardware timer 15. However, the management of the timing is not limited to this. For example, a timing instruction of data shared between cores may be given from a core of time division.

(xii) Modified Example 12

Since the same hardware timer 15 is referred to, the time can be synchronized between multiple cores. However, a time synchronization method is not limited to this method. For example, two hardware timers may be provided so as to synchronize the hardware timers with each other when the system is started up.

(3) SUMMARY (i) In the vehicle control device according to the present embodiment, the core 1 (the first computation device) between multiple cores is configured to execute first type of computation processing executed not by time division, and the core 2 (the second computation device) is configured to execute second type of computation processing executed by time division. Configuring the vehicle control device in such a manner enables to handle an interrupt process by the core (the core 1) that does not perform time division processing, and therefore a highly responsive and highly reliable system can be built.

The core 2 generates data (for example, track information) by predetermined computation. During a time period during which the core 2 does not refer to the generated data, the core 1 stores the generated data in the shared data buffer as shared data, and then updates the shared data (the operation entity of updating may be the core 2). In addition, the core 1 replicates the shared data at the time at which the core 1 does not refer to the shared data, and stores the replicated shared data in the temporary buffer area (the operation entity of replication may be the core 2). Configuring the vehicle control device in such a manner enables to execute an interrupt process at the time at which the shared data is not referred to by time division processing (processing that should be cyclically executed (for example, the sensor fusion processing, the dynamic map generation processing, the course generation processing, etc.)). Consequently, the shared data is never rewritten during time division processing. Accordingly, the reliability of the result of the time division processing can be ensured. Incidentally, as the time period during which the core 2 does not refer to the shared data, a time period to which time division processing to be executed is not assigned (available slot), a time period during which control processing that does not refer to the shared data is executed (available time in a slot to which time division processing is assigned), or a time period during which microcomputer diagnostic processing is executed, can be mentioned.

With respect to a plurality of tasks executed by an interrupt process, the core 1 schedules the execution of each task on the basis of a priority given to each task. This enables to reliably execute an important interrupt process.

When the end time of a slot to which a task subjected to time division processing is assigned is reached, in a case where a task that should end in the slot has not ended, the core 2 brings the task that has not ended into a standby state. Subsequently, the core 2 causes the task that has not ended to restart in a slot in the next cycle. In this case, an error may be notified. Alternatively, the core 2 may cause the task not to restart but to merely end. By configuring the vehicle control device in such a manner, even if a process executed by time division takes the operation time longer than expected at the time of design, with the result that there occurs a situation in which a process does not end within the slot time, the abnormality can be detected, and only the target process can be restarted or ended. In addition, as the result, no influence is exerted on other processes executed by time division. Therefore, the vehicle control device is suitable for an automatic driving system that requires high reliability.

(ii) The present disclosure can also be realized by a software program code that realizes the functions of the embodiments. In this case, a storage medium having the program code recorded therein is provided to a system or a device, and the program code stored in the storage medium is read by a computer (or CPU or MPU) in the system or device. In this case, the functions of the embodiments are realized by the program code per se that has been read from the storage medium, and the program code per se and the storage medium having the same stored therein constitute the present disclosure. As a storage medium that supplies such a program code, for example, a flexible disk, a CD-ROM, a DVD-ROM, a hard disk, an optical disk, a magneto-optical disk, a CD-R, a magnetic tape, a nonvolatile memory card, a ROM or the like is used.

In addition, some or all of the actual processes may be performed by an OS (operating system) and the like running on a computer in accordance with program code instructions, so that the functions of the embodiments can be realized by the processes. Moreover, the program code read from the storage medium may be written to a memory in a computer, and subsequently some or all of the actual processes may be performed by the CPU and the like of the computer in accordance with the program code instructions, so that the functions of the above-described embodiments can be realized by the processes.

Further, a software program code for realizing the function of an embodiment may be delivered via a network, and stored in a storage means, such as a hard disk or memory of a system or device, or in a storage medium such as a CD-RW or a CD-R. At the time of use, the program code stored in the storage means or the storage medium may be read and executed by a computer (or CPU or MPU) in the system or device.

Finally, it is necessary to understand that the processes and technologies described herein are not inherently related to a particular device, and may be implemented by any appropriate combination of components. Further, various general-purpose devices can be used in accordance with the teachings described herein. It may prove beneficial at times to construct a dedicated device to execute the method steps described herein. In addition, various inventions can be formed by appropriate combinations of a plurality of constituent elements disclosed in the embodiments. For example, some of the constituent elements indicated in an embodiment may be deleted. Further, constituent elements from different embodiments may be appropriately combined. While the present disclosure has been described with reference to specific examples, the examples are not intended to limit the invention but are illustrative in all aspects. Those skilled in the present field will recognize that there are a number of combinations of hardware, software, and firmware appropriate for implementing the present disclosure. For example, the described software may be implemented by a wide range of programs or script languages, such as assembler, C/C++, perl, Shell, PHP, and Java (registered trademark).

In addition, in the above-described embodiments, the control lines or information lines illustrated are only those considered to be necessary for description, and do not necessarily represent all of the control lines or information lines found in a product. All of the configurations may be mutually connected.

In addition, other implementations of the present disclosure will become apparent to those skilled in the art when consideration is given to the description of the present disclosure and the embodiments disclosed herein. The various modes and/or components of the described embodiments may be used individually or in any combination. The description and specific examples are merely exemplary, and the scope and spirit of the present disclosure are indicated by the following claims.

REFERENCE SIGNS LIST 1 vehicle control device
11 computation device (core 1)
12 computation device (core 2)
13 memory
14 input/output circuit
15 hardware timer
16 in-vehicle network
100 program area
110 core 1 initialization unit
111 slot synchronous processing timing setting unit
112 alarm processing unit
113 slot synchronous read processing unit
114 slot synchronous write processing unit
115 priority scheduling unit
116 transmission processing unit
117 reception interrupt processing unit
120 core 2 initialization unit
121 slot setting unit
122 sensor fusion unit
123 dynamic map generation unit
124 course generation unit
125 time-driven scheduling unit
130 data storage area (shared data buffer)
131 slot setting information
132 alarm setting information
133 task information
134 outside recognition information
135 course information
136 state data
137 map information

The invention claimed is:

1. A vehicle control device comprising:
a storage device that stores various programs for controlling a vehicle; and
a plurality of computation devices that include a first computation device and a second computation device, and that read a program from the storage device and execute the program; and
a storage device that stores shared data calculated by the second computation device, wherein
the storage device that stores various programs for controlling a vehicle includes a first type of computation processing program executed not by time division, and a second type of computation processing program executed by time division,
the first computation device executes the first type of computation processing program, and
the second computation device executes the second type of computation processing program,
in a time period during which the second computation device does not refer to the shared data, the first computation device updates the shared data, and
the time period during which the second computation device does not refer to the shared data is a time period to which the second type of computation processing to be executed is not assigned, a time period during which control processing that does not refer to the shared data is executed, or a time period during which microcomputer diagnostic processing is executed.

2. The vehicle control device according to claim 1, wherein at time at which the first computation device does not refer to the shared data, the first computation device replicates the shared data, and stores the replicated shared data in a temporary buffer area.

3. The vehicle control device according to claim 1, wherein
priorities are defined for a plurality of tasks corresponding to the first type of computation processing, and
the first computation device schedules execution of the plurality of tasks corresponding to the first type of computation processing on the basis of the priorities.

4. The vehicle control device according to claim 1, wherein
a slot that prescribes a time period during which the second type of computation processing is executed is set beforehand, and
when end time of the slot is reached in a case where the second type of computation processing that should end in the slot has not ended, the second computation device brings execution of the second type of computation processing that has not ended into a standby state, and restarts the execution of the second type of computation processing that has not ended in a slot in a next cycle.

5. The vehicle control device according to claim 1, wherein
a slot that prescribes a time period during which the first type of computation processing is executed, and a slot that prescribes a time period during which the second type of computation processing is executed, are determined beforehand.

6. The vehicle control device according to claim 1, wherein
worst-case execution time that is the longest time taken at the time of execution is given beforehand to a task corresponding to the first type of computation processing, and to a task corresponding to the second type of computation processing, and
on the basis of the worst-case execution time, the first computation device or the second computation device determines a size of a slot that is a time period for executing each task.

7. The vehicle control device according to claim 1, wherein
a slot that prescribes a time period during which the second type of computation processing is executed is set beforehand, and
the first computation device processes a task corresponding to the first type of computation processing at available time at which the second type of computation processing is not executed in the slot.

8. A vehicle system comprising:
an outside recognition device that obtains outside recognition information for recognizing an outside situation;
a vehicle control device comprising a storage device that stores various programs for controlling a vehicle; and a plurality of computation devices that include a first computation device and a second computation device, and that read a program from the storage device and execute the program, wherein the storage device includes a first type of computation processing program executed not by time division, and a second type of computation processing program executed by time division, the first computation device executes the first type of computation processing program, and the second computation device executes the second type of computation processing program; and
an in-vehicle network, wherein the vehicle control device obtains the outside recognition information from the outside recognition device through the in-vehicle network, executes the second type of computation processing for the outside recognition information, and transmits a processing result of the second type of computation processing to the other vehicle devices or output devices through the in-vehicle network;
wherein in a case where the vehicle control device detects a processing time error in a slot that prescribes a time period during which the second type of computation processing is executed, the vehicle control device notifies of a specific function error through the in-vehicle network.

9. A vehicle system comprising:
an outside recognition device that obtains outside recognition information for recognizing an outside situation;
a vehicle control device comprising a storage device that stores various programs for controlling a vehicle; and a plurality of computation devices that include a first computation device and a second computation device, and that read a program from the storage device and execute the program, wherein the storage device includes a first type of computation processing program executed not by time division, and a second type of computation processing program executed by time division, the first computation device executes the first type of computation processing program, and the second computation device executes the second type of computation processing program; and
an in-vehicle network, wherein the vehicle control device obtains the outside recognition information from the outside recognition device through the in-vehicle network, executes the second type of computation processing for the outside recognition information, and transmits a processing result of the second type of computation processing to the other vehicle devices or output devices through the in-vehicle network;
wherein in a case where the vehicle control device detects a processing time error in a slot that prescribes a time period during which the second type of computation processing is executed, the vehicle control device causes a function related to the processing time error to be recovered.

* * * * *